US008117927B2

(12) United States Patent
Millet et al.

(10) Patent No.: US 8,117,927 B2

(45) Date of Patent: Feb. 21, 2012

(54) PIPETTE PROVIDING SAMPLING VIA BACK-AND-FORTH MOVEMENT OF THE PISTON

(75) Inventors: Frédéric Millet, Paris (FR); Hervé Malvoisin, Paris (FR)

(73) Assignee: Gilson SAS, Villiers le Bel (FR)

( * ) Notice: Subject to any disclaimer, the term of this patent is extended or adjusted under 35 U.S.C. 154(b) by 244 days.

(21) Appl. No.: 12/638,682

(22) Filed: Dec. 15, 2009

(65) Prior Publication Data

US 2010/0132486 A1 Jun. 3, 2010

Related U.S. Application Data

(63) Continuation of application No. PCT/EP2008/058090, filed on Jun. 25, 2008.

(30) Foreign Application Priority Data

Jun. 25, 2007 (FR) ..................................... 07 56008

(51) Int. Cl.
*B01L 3/02* (2006.01)
*G01N 1/14* (2006.01)

(52) U.S. Cl. ............... 73/864.15; 73/863.02; 73/864.16; 73/864.22

(58) Field of Classification Search .. 73/864.15–864.16, 73/863.01–863.03, 863.32, 864.22, 864.13
See application file for complete search history.

(56) References Cited

U.S. PATENT DOCUMENTS

| | | | | |
|---|---|---|---|---|
| 3,137,174 | A * | 6/1964 | Hawk et al. | 73/864.16 X |
| 3,640,434 | A | 2/1972 | Walker | |
| 3,835,874 | A | 9/1974 | Dellasala | |
| 4,679,446 | A | 7/1987 | Sheehan et al. | |
| 2002/0164808 | A1 * | 11/2002 | Itaya et al. | 436/54 |
| 2005/0220676 | A1 | 10/2005 | Tran | |
| 2007/0169571 | A1 * | 7/2007 | May et al. | 73/864.13 |

FOREIGN PATENT DOCUMENTS

EP 1 477 227 11/2004

OTHER PUBLICATIONS

French Search Report and Opinion for French Patent Application No. FR 0756008 and mailed Feb. 13, 2008, in French.

International Search Report and Written Opinion for PCT/EP2008/058090 mailed Oct. 7, 2008, in French.

Office Action issued in Chinese Patent Application No. 200880022088.X and dated Sep. 13, 2011.

* cited by examiner

*Primary Examiner* — Thomas P Noland

(74) *Attorney, Agent, or Firm* — Foley & Lardner LLP

(57) ABSTRACT

A pipette is provided. The pipette includes a body, a piston, and a valve. The body includes a nozzle, a first chamber, a second chamber, and a channel formed in the nozzle. The first chamber is isolated from the second chamber, and the channel is isolated from the first chamber and the second chamber. The piston is mounted to slide within the first chamber and the second chamber so that movement of the piston simultaneously increases a first volume of the first chamber and decreases a second volume of the second chamber. The valve is in communication with the first chamber, the second chamber, the channel, and an exterior of the body to selectively provide a communication between the first chamber and the channel, between the second chamber and the channel, between the first chamber and the exterior of the body, and between the second chamber and the exterior of the body.

20 Claims, 14 Drawing Sheets

PIPETTE PROVIDING SAMPLING VIA BACK-AND-FORTH MOVEMENT OF THE PISTON

CROSS-REFERENCE TO RELATED APPLICATIONS

This application is a continuation application of International Application No. PCT/EP2008/058090 filed on Jun. 25, 2008, the entire contents of which is hereby incorporated by reference; which claims priority under the Paris Convention to French Patent Application No. 0756008, filed Jun. 25, 2007, the disclosure of which is incorporated by reference herein in its entirety.

BACKGROUND

Sampling pipettes are known from the prior art having a conventional design of the type integrating an upper pipette body forming a handle, and a lower pipette body having at its lower end one or more tip holding nozzles, whose function is to hold sampling tips, also called consumables. The lower pipette body houses a sliding piston controlled by manual or motorized equipment causing the piston to move upward during liquid sampling phases and to move downward during liquid transfer phases. The upward movement is generally performed under the effect of release of a spring that is compressed during the previous downward movement. This type of design is found both in single channel pipettes, having a single tip holding nozzle, and in multichannel pipettes, having a plurality of tip holding nozzles, whether the pipette is manual or motorized.

The upward stroke imposed upon the piston determines the volume of sampled liquid, a volume which is previously set by the user using a variety of possible controls including a thumb wheel, an adjusting screw, a digital keypad, etc.

On conventional pipettes, the piston is of strictly cylindrical shape and slides within a cavity of complementary shape, made in the lower body of the pipette and delimiting an aspiration chamber. The aspiration chamber is partly delimited by the lower end of the piston, which means that its volume varies when the piston is moved. Therefore, the volume of sampled liquid, corresponding to the increase in air volume in the aspiration chamber subsequent to a given stroke of the piston, is substantially equal to the product of the cross-section of the piston by the length of the given stroke of the piston.

Consequently, the sampling capacity of a pipette is determined at the present time both by the cross-section of the piston and by the length of the maximum stroke. Therefore, to increase pipette capacity in terms of the maximum value of liquid volume the pipette can sample or the ratio between the maximum and minimum values the liquid volume pipette can sample, typically in the order of 10 to 20, it is necessary to increase the value of at least one of the cross-section of the piston and/or the length of the piston stroke. Relative to the maximum stroke length, any increase in length rapidly leads to problems of global ergonomics for the pipette. Relative to the cross-section of the piston, i.e. the piston diameter, any increase thereof generally has a detrimental effect on the accuracy and repeatability of the sampled volume. The design of conventional pipettes does not therefore allow the simultaneous combining of essential criteria such as a large sampling capacity, ergonomics, accuracy, and repeatability of sampled volumes.

Multi-volume pipettes include a succession of chambers of increasing diameters/volumes starting from the tip holder, each one cooperating with a piston section of corresponding diameter. The placing or non-placing in communication of these chambers, isolated from each other, allows the pipette to be adapted to the value of the liquid volume to be sampled. Nevertheless, multi-volume pipettes do not solve the problems in a fully satisfactory manner because the more the capacity of the pipette is increased, the greater the number of aspiration chambers that are superimposed in the direction of the piston's sliding movement. The increase in the number of chambers leads to an increase in the total length of the pipette which is detrimental to the pipette's ergonomics. Also, the greater the volume of liquid to be sampled, the less accuracy and repeatable the pipette becomes due to the chamber and piston having a greater diameter.

SUMMARY

In an example embodiment, a pipette is provided. The device includes, but is not limited to, a body, a piston, and a valve. The body includes a nozzle, a first chamber, a second chamber, and a channel formed in the nozzle. The first chamber is isolated from the second chamber, and the channel is isolated from the first chamber and the second chamber. The piston is mounted to slide within the first chamber and the second chamber so that movement of the piston simultaneously increases a first volume of the first chamber and decreases a second volume of the second chamber. The valve is in communication with the first chamber, the second chamber, the channel, and an exterior of the body to selectively provide a communication between the first chamber and the channel, between the second chamber and the channel, between the first chamber and the exterior of the body, and between the second chamber and the exterior of the body.

In another example embodiment, a computer-readable medium is provided having stored thereon computer-readable instructions that, when executed by a processor, cause a device to:

(a) switch a valve to provide communication between a first chamber and an exterior of a body of the device wherein the body houses a nozzle, the first chamber, a second chamber, a channel formed in the nozzle, and a piston mounted to slide within the first chamber and the second chamber;

(b) switch the valve to provide communication between the second chamber and the channel, wherein the second chamber and the channel are isolated from the first chamber;

(c) slide the piston in a first direction decreasing a first volume of the first chamber and increasing a second volume of the second chamber thereby aspirating a first volume of liquid into a tip of the device;

(d) switch the valve to provide communication between the first chamber and the channel;

(e) switch the valve to provide communication between the second chamber and the exterior of the body;

(f) slide the piston in a second direction opposite the first direction increasing the first volume of the first chamber and decreasing the second volume of the second chamber thereby aspirating a second volume of liquid into the tip of the device; and (g) repeat (a)-(f) until a selected volume is aspirated into the tip of the device.

Other principal features and advantages of the invention will become apparent to those skilled in the art upon review of the following drawings, the detailed description, and the appended claims.

BRIEF DESCRIPTION OF THE DRAWINGS

Example embodiments of the invention will hereafter be described with reference to the accompanying drawings, wherein like numerals denote like elements.

DETAILED DESCRIPTION

Figure 1:
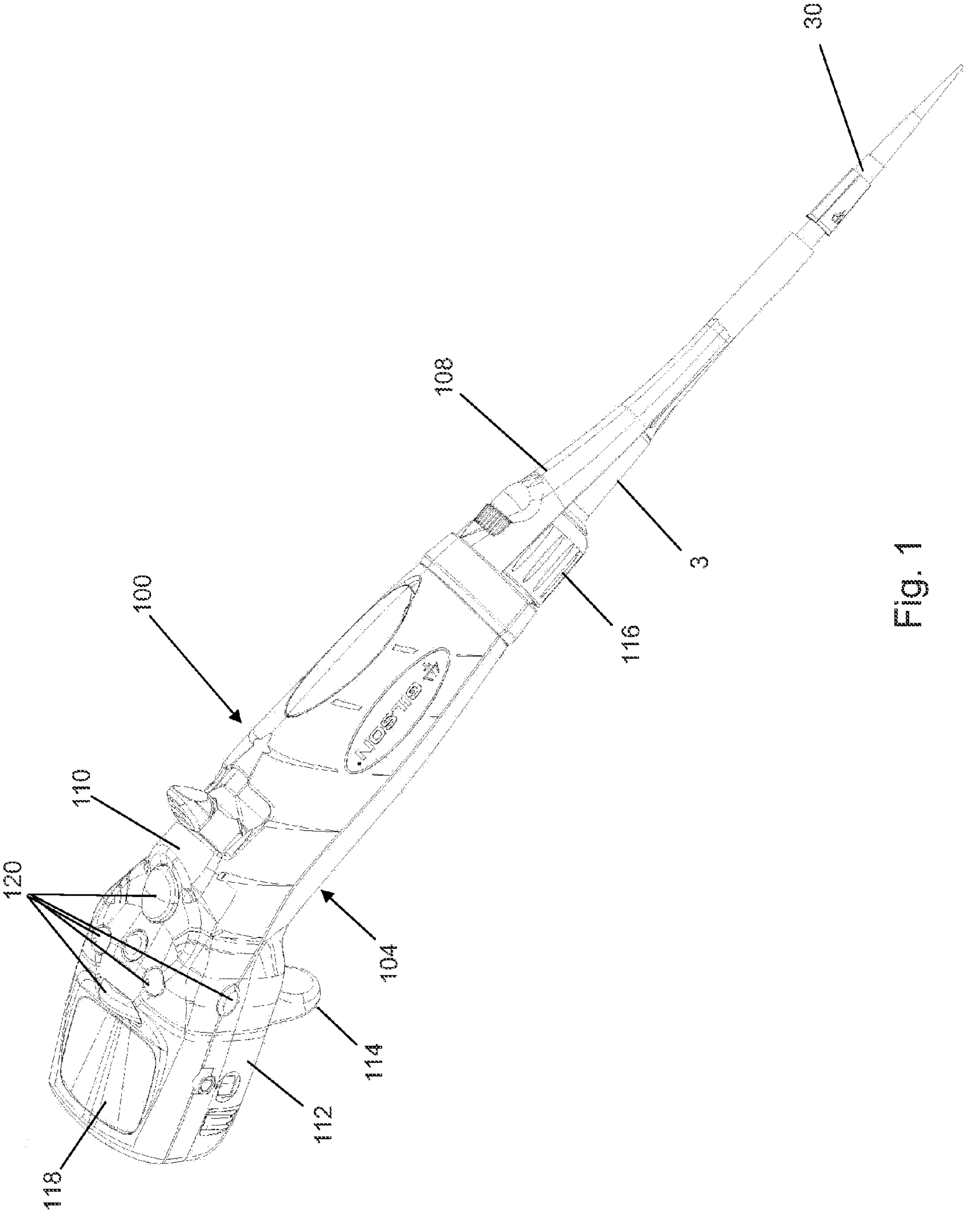
FIG. 1 is a perspective view of a sampling pipette in accordance with an example embodiment.

With reference to FIG. 1, a sampling pipette 100 is shown in accordance with an example embodiment. Sampling pipette 100 can be controlled to manually or electronically aspirate and dispense liquid volumes into a sampling tip 30. In the example embodiment of FIG. 1, sampling pipette 100 is hand-held. In alternative embodiments, the sampling pipette may include a multichannel pipette and/or the sampling pipette may not be hand-held. Sampling pipette 100 includes a number of components and subsystems that together provide various operational modes for aspirating and dispensing liquids in specified volumes. With reference to FIG. 1, the external components and subsystems of sampling pipette 100 may include, but are not limited to, a body case 104, a nozzle 3, a tip ejector 108, a display 118, and a plurality of user controls 120. Some of these components and subsystems are known to those skilled in the art, and thus, will not be discussed in significant detail herein.

In the example embodiment of FIG. 1, body case 104 provides a comfortable external cover for a user holding sampling pipette 100 and protects the components of sampling pipette 100. Body case 104 includes, but is not limited to, a front case 110, a rear case 112, and a finger rest 114. Front case 110 mounts to rear case 112 to enclose a piston drive mechanism, a piston, and control electronics. Finger rest 114 mounts to rear case 112 and provides a bracing point, for example, for the pipette user's index finger to rest against while holding the body of sampling pipette 100 in the palm of the hand. As used herein, the term "mount" includes join, unite, connect, associate, insert, hang, hold, affix, attach, fasten, bind, paste, secure, bolt, screw, rivet, solder, weld, press against, formed with, glue, and other like terms.

Nozzle 3 mounts to body case 104. In the example embodiment of FIG. 1, a nut 116 slides over an end of front case 110 and an end of rear case 112 to mount front case 110 to rear case 112 and nozzle 3 to body case 104. Nut 116 thus allows removable mounting of the external body components to each other.

Figure 2:
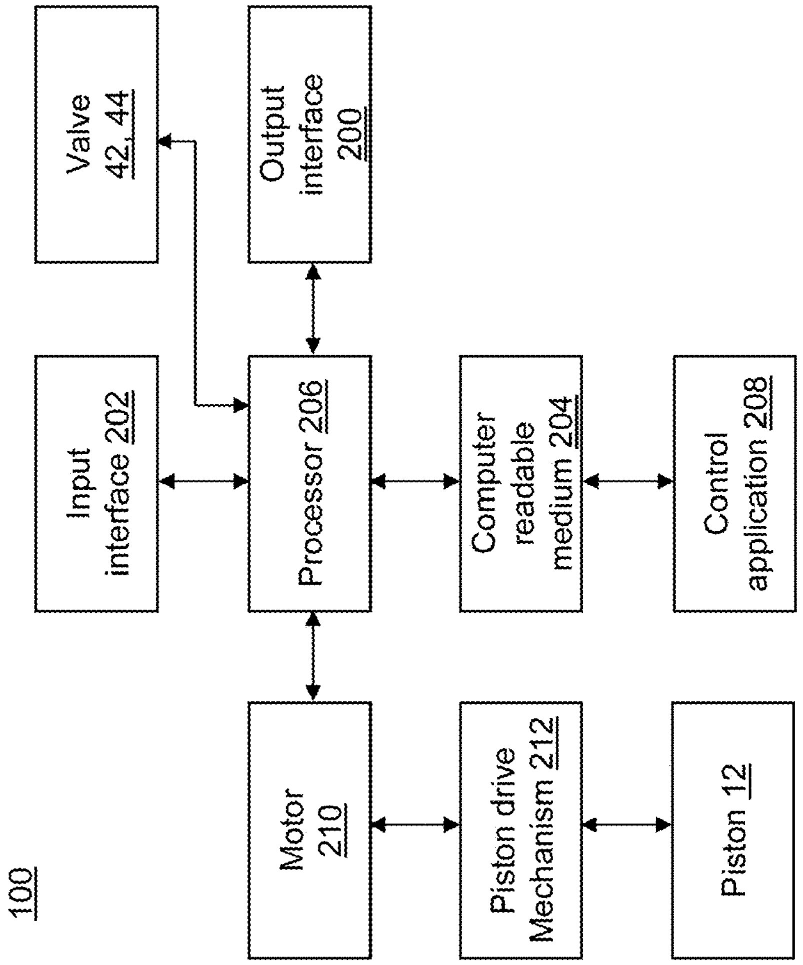
FIG. 2 is a block diagram of a sampling pipette in accordance with an example embodiment.

With reference to FIG. 2, a block diagram of internal components of sampling pipette 100 is shown in accordance with an example embodiment. Sampling pipette 100 may further include an output interface 200, an input interface 202, a computer-readable medium 204, a processor 206, a control application 208, a motor 210, a piston drive mechanism 212, a piston 12, and one or more valves 42, 44. In another example embodiment, one or more of the components of sampling pipette 100 may be located at a distance from the other components and connected through either wired or wireless communication technologies.

Output interface 200 provides an interface for outputting information for review by a user of sampling pipette 100. For example, output interface 200 may include an interface to display 118. Display 118 may be a thin film transistor display, a light emitting diode display, a liquid crystal display, or any of a variety of different displays known to those skilled in the art. Sampling pipette 100 may have one or more output interfaces that use the same or a different interface technology.

Input interface 202 provides an interface for receiving information from the user for entry into sampling pipette 100 as known to those skilled in the art. Input interface 202 may use various input technologies including, but not limited to, a keyboard, a pen and touch screen, a mouse, a track ball, a touch screen, a keypad, one or more buttons, etc. to allow the user to enter information into sampling pipette 100 or to make selections presented in a user interface displayed on display 118. Input interface 202 may provide both an input and an output interface. For example, a touch screen both allows user input and presents output to the user. Sampling pipette 100 may have one or more input interfaces that use the same or a different input interface technology. For example, sampling pipette 100 may include the plurality of user controls 120 that can be used by an operator of sampling pipette 100 to control the operating characteristics of sampling pipette 100. The plurality of user controls 120 may include a thumbwheel, buttons, adjustment screws, a digital keypad, etc.

Computer-readable medium 204 is an electronic holding place or storage for information so that the information can be accessed by processor 206 as known to those skilled in the art. Computer-readable medium 204 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., CD, DVD, . . . ), smart cards, flash memory devices, etc. Sampling pipette 100 may have one or more computer-readable media that use the same or a different memory media technology. Sampling pipette 100 also may have one or more drives that support the loading of a memory media such as a CD or DVD.

Processor 206 executes instructions as known to those skilled in the art. The instructions may be carried out by a special purpose computer, logic circuits, or hardware circuits. Thus, processor 206 may be implemented in hardware or firmware, or any combination of these methods. The term "execution" is the process of running an application or the carrying out of the operation called for by an instruction. The instructions may be written using one or more programming language, scripting language, assembly language, etc. Processor 206 executes an instruction, meaning that it performs the operations called for by that instruction. Processor 206 operably couples with output interface 200, with input interface 202, with computer-readable medium 204, with motor 210, and with the one or more valves 42, 44 to receive, to send, and to process information. Processor 206 may retrieve a set of instructions from a permanent memory device and copy the instructions in an executable form to a temporary memory device that is generally some form of RAM. Sampling pipette 100 may include a plurality of processors that use the same or a different processing technology.

Control application 208 performs operations associated with control of sampling pipette 100. Control application 208 may receive input through input interface 202. Control application 208 may be written using one or more programming languages, assembly languages, scripting languages, etc.

Piston drive mechanism 212 causes the aspiration and dispensation of a specified volume of liquid into and out of sampling tip 30 by moving piston 12 within a chamber housed in body case 104 along a longitudinal axis that extends along the body of sampling pipette 100. Motion of piston 12 produces an air displacement that aspirates or dispenses liquid into or out of sampling tip 30. Piston drive mechanism 212 may be manually positioned and moved by a user. In an alternative embodiment, piston drive mechanism 212 may be positioned and moved by motor 210.

Motor 210 may position piston drive mechanism 212 and move piston 12 under the control of processor 206 and control application 208. Motor 210 may be implemented using a variety of electromechanical devices as known to those skilled in the art. Motor 210 through piston drive mechanism 212 precisely moves piston 12 up and down the longitudinal axis of sampling pipette 100 to aspirate or to dispense liquid into or out of sampling tip 30.

Figure 3:
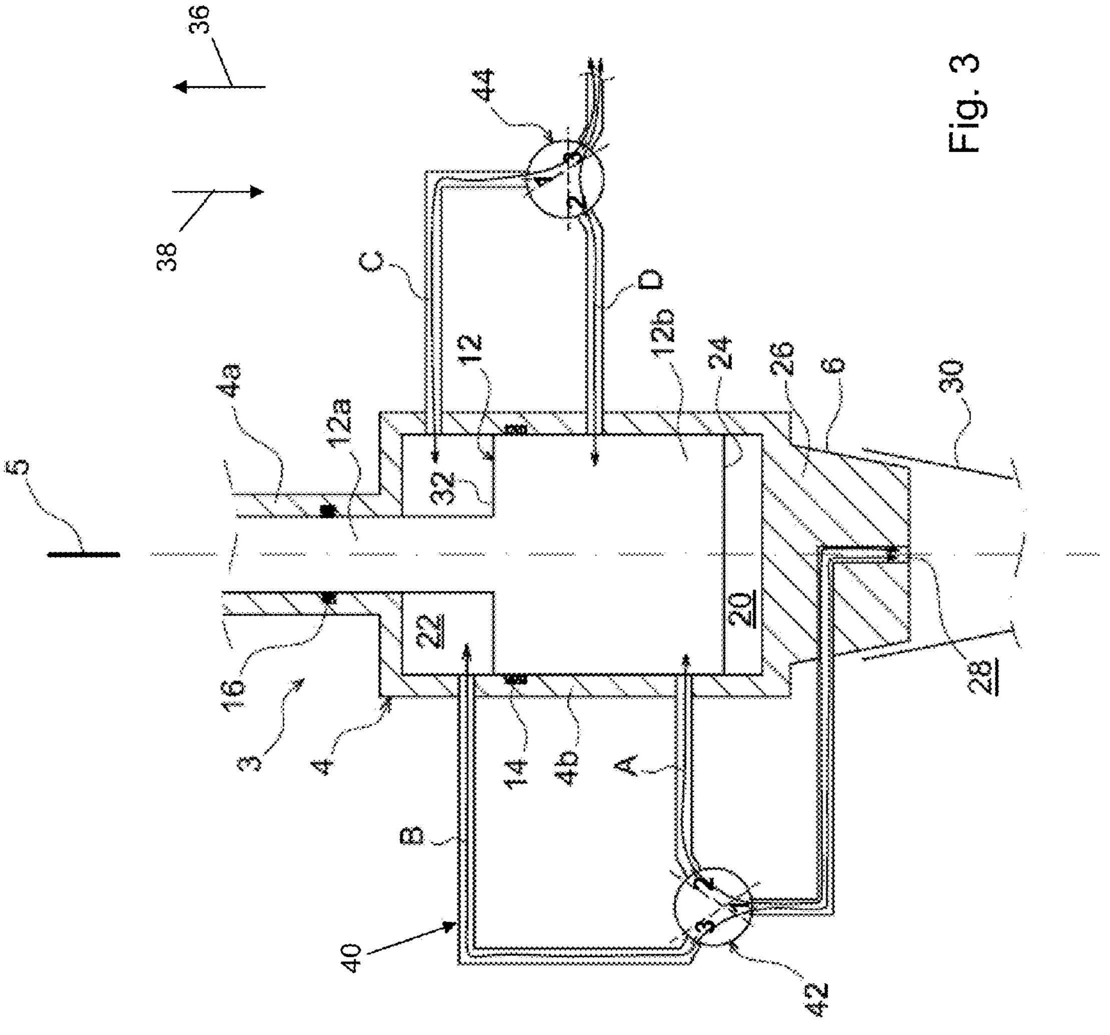
FIG. 3 depicts a partial, cross-sectional, side view of a sampling pipette in accordance with a first example embodiment.

With reference to FIG. 3, a portion of sampling pipette 100 is shown in accordance with a first example embodiment. In the description, the indications "top"/"upper"/"bottom"/"lower" are to be considered with respect to a longitudinal axis 5 of the pipette when it is held in an operator's hand for a pipetting operation or mounted to perform a pipetting operation. Nozzle 3 may have a variety of shapes and sizes and may include one or more sections. In the example embodiment of FIG. 3, nozzle 3 includes a lower pipette body 4 which may comprise at the lower end a tip holding nozzle 6 of conventional flattened cone shape. Lower pipette body 4 is hollow so that it can house piston 12 mounted to slide in an appropriate cavity.

Piston 12 is housed in the cavity and has an upper cylindrical portion 12*a* and a lower cylindrical portion 12*b* of larger diameter, each of the portions 12*a*, 12*b* respectively being guided by a section of the lower body 4*a*, 4*b* of complementary shape. Additionally, each of the two sections 4*a*, 4*b* respectively is hollow and has a fixed seal. The seals follow the contour of piston 12 which slides with respect thereto.

With reference to the example embodiment of FIG. 3, a lower aspiration chamber 20 is delimited by a lower seal 14, a lower end 24 of piston 12, an inner wall of section 4*b*, and a lower wall 26 made in lower pipette body 4. Lower wall 26 isolates chamber 20 from a nozzle through channel 28 made at least in part along axis 5 in tip holding nozzle 6 so that it can communicate with sampling tip 30 when it is fitted onto tip holding nozzle 6. More precisely, channel 28 leads downwards into sampling tip 30 and, in its more upper part, has a branch point so that it can open into its other end radially/laterally relative to lower pipette body 4, enabling it to communicate with valve 42.

An upper aspiration chamber 22 is delimited by an upper seal 16, an upper piston portion 12*a*, an inner wall of section 4*b*, an upper end 32 of the lower piston portion 12*b*, and a seal 14. Seal 14 assists in isolating the two aspiration chambers 20, 22. The upper aspiration chamber 22 is additionally isolated from nozzle through channel 28.

With this arrangement in which piston portions 12*a*, 12*b* respectively follow the contour of the inner wall of section 4*a* and the inner wall of section 4*b*, the chamber 20 has a constant cross section relative to axis 5, in the form of a disc having the same axis and a diameter equal to the diameter of the inner wall of section 4*b*. Chamber 22 has a constant cross section relative to axis 5, in the shape of an annular ring of the same axis having an outer diameter equal to the inner wall of section 4*b*, and an inner diameter equal to the outer diameter of the upper piston portion 12*a*.

Piston 12 is moved to slide up or down parallel to longitudinal axis 5 relative to lower pipette body 4. In the remainder of the description, the direction of upward sliding 36 is termed an "upward stroke" of piston 12 while the direction of downward sliding 38 is termed a "downward stroke" of piston 12. Therefore, an upward stroke of piston 12 simultaneously causes an increase in the volume of the lower chamber 20 and a decrease in the volume of the upper chamber 22, while conversely a downward stroke of piston 12 simultaneously causes an increase in the volume of the upper chamber 22 and a decrease in the volume of the lower chamber 20. In another example embodiment, the effects described above can be reversed with a different design of the chamber 20, 22.

The pipette 100 also comprises fluid communication implementation means 40 comprising two three-way solenoid valves 42, 44 of known type, which will not be further described. However, by way of indication, three-way solenoid valves 42, 44 may be linear piston solenoid valves having three inlets 1, 2, 3 which, via the movement of piston 12, alternately support communication between inlets 1 and 2 and between inlets 1 and 3. Example three-way solenoid valves 42, 44 may be those marketed by LEE COMPANY under reference LHDA 053 1115H.

The fluid communication implementation means 40, when appropriately controlled, they allow liquid to be sampled both during the upward stroke of the piston 12 and during its downward stroke, so that liquid can be drawn into the sampling tip 30 continuously during a back-and-forth (up and down) movement of the piston 12. Using this mechanism, the only limitation on the maximum volume which can be sampled is therefore the capacity of the sampling tip 30 and no longer the design of the pipette as was the case with prior art embodiments. Additionally, subsequent dispensing of the liquid into another receptacle is similarly performed i.e. via a back-and-forth (up and down) movement of the piston 12, which may if necessary comprise several return strokes.

The first three-way solenoid valve 42 is mounted to alternately place in communication one of the two chambers 20, 22 with the nozzle through channel 28, while the second three-way solenoid valve 44 is mounted to alternately place in communication one of the two chambers 20, 22 with the exterior of body case 104 of pipette 100. The valves 42, 44 are synchronized and controlled automatically by processor 206 under control of control application 208 to which valves 42, 44 are electrically connected.

Therefore, the first solenoid valve 42 has three inlets 1,2,3 of which inlet 1 communicates with the nozzle through channel 28 at its upper end opening radially/laterally into the body 4, inlet 2 communicates with the lower chamber 20 via a first channel connected through the wall of section 4*b*, and inlet 3 communicates with the upper chamber 22 via a second channel connected through the wall of section 4*b*. The above-indicated communications may be permanently established by connecting conduits or by channels directly made in pipette body 4. The inlets only communicate with each other when the first solenoid valve 42 is controlled for this purpose. In the example embodiment, only communications between inlets 1 and 2 and between inlets 1 and 3 may be alternately provided by the sliding valve piston. Communication between inlets 2 and 3 may not implemented and may be made impossible by the design of the solenoid valve.

Similarly, the second solenoid valve 44 has three inlets 1, 2, 3 of which inlet 1 communicates with the upper chamber 22 via a third channel connected through the wall of section 4*b*, inlet 2 communicates with the lower chamber 20 via a fourth channel connected through the wall of section 4*b*, and inlet 3 communicates with the ambient air exterior of body case 104 of pipette 100. The communications may be established permanently e.g. via simple connecting conduits. The inlets may only communicate with each other when the second solenoid valve 44 is controlled for this purpose. In the example embodiment, only communications between inlets 1 and 2 and between inlets 1 and 3 may be alternately provided by the sliding valve piston. Communication between inlets 2 and 3 may not implemented and may be made impossible by the design of the solenoid valve.

Therefore, with reference to FIG. 3, when inlets 1 and 2 of first solenoid valve 42 are in communication, a first fluid communication referenced A provides a free circulation of air between the lower chamber 20 and the nozzle channel 28 leading into the tip 30, but prevents communication of nozzle channel 28 with chamber 22. Also, when inlets 1 and 3 of first solenoid valve 42 are in communication, they ensure a second fluid communication referenced B, which provides free circulation of air between the upper chamber 22 and the nozzle channel 28 leading into the tip 30, but prevents communication of nozzle channel 28 with chamber 20.

Similarly, the second solenoid valve 44, when inlets 1 and 3 are in communication, ensures a third fluid communication referenced C, which provides free circulation of air between the upper chamber 22 and the exterior of body case 104 of pipette 100, but prevents communication between the exterior and chamber 20. Also, when inlets 2 and 3 are in communication, they ensure a fourth fluid communication referenced D, which provides free circulation of air between the lower chamber 20 and the exterior of the pipette, but in this case prevents communication between the exterior and chamber 22.

With reference to FIGS. 4*a* to 4*d*, the operation of sampling pipette 100 is illustrated. First, the pipette user enters the value of the volume to be sampled using for example, the plurality of user controls 120. The entered value may be displayed on display 118 and transmitted to a processor 206 executing control application 208.

Control application 208 determines the number of piston strokes and their length in relation to the volume to be sampled. For example, if the desired value is 400 microliters (μl), and each maximum upward and downward stroke allows a quantity of 100 μl to be sampled, control application 208 determines that two return strokes of the piston 12 are made with maximum stroke lengths each ensuring the sampling of 100 μl. Because in the example embodiment of FIG. 3, the two chambers 20, 22 have different cross sections, to obtain the same sampling or the same dispensing of liquid in both stroke directions, one of the two strokes lengths may be set at a higher value than the other.

The above data, once determined, can optionally be displayed on display 118 for visualization by the user who may initiate pipetting for example by pressing a button of the plurality of user controls 120 provided for this purpose, after dipping the tip 30 in the recipient of liquid to be sampled.

Control application 208 may deliver instructions to the solenoid valves 42, 44 so that they switch over to a configuration setting up communications A and C if not already established. Control application 208 may deliver instructions to motor 210 to place the piston in upward movement 36 which upward movement may be obtained by mere releasing of a spring compressed during a preceding downward phase of the piston 12. During this movement, the volume of chamber 20 increases which sets up aspiration in communication A in the direction leading from the channel 28 towards chamber 20, since communication C isolates this chamber from the exterior air. This aspiration translates as rising of the liquid in the sampling tip 30 whose distal end is immersed in this same liquid. At the same time, communication C allows air to escape from the upper chamber 22 whose volume decreases, the air escaping to exterior the pipette prevents the onset of over-pressure in chamber 22.

Figure 4A:
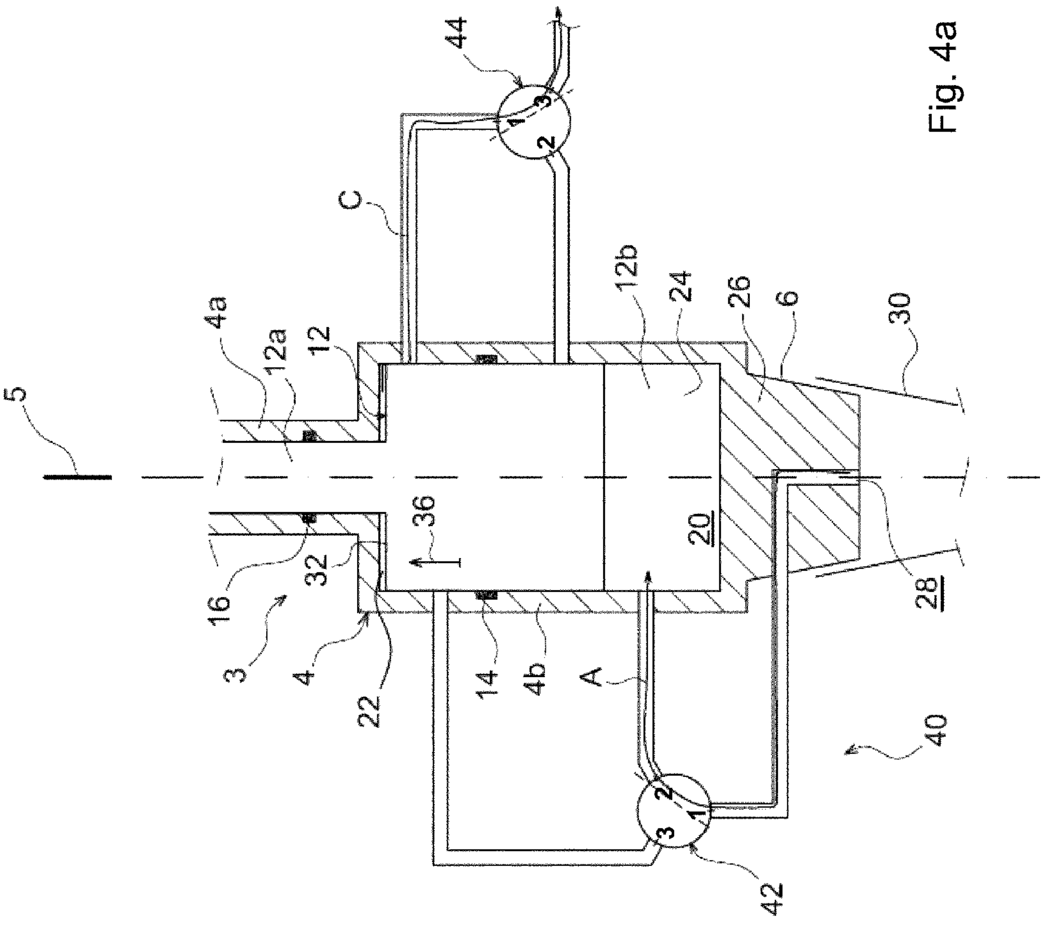
FIGS. 4*a* to 4*d* depict partial, cross-sectional, side views of the sampling pipette of FIG. 3 illustrating use of the sampling pipette.
Figure 4B:
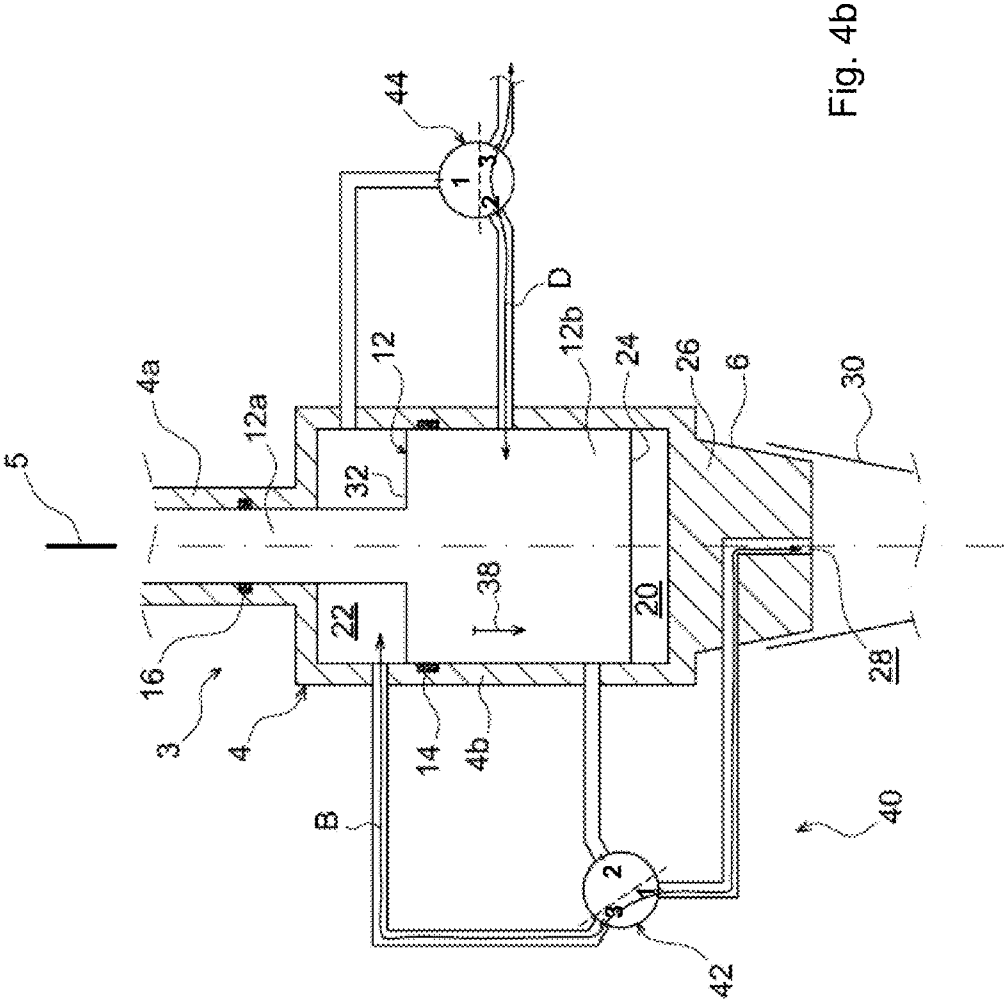
Figure 4C:
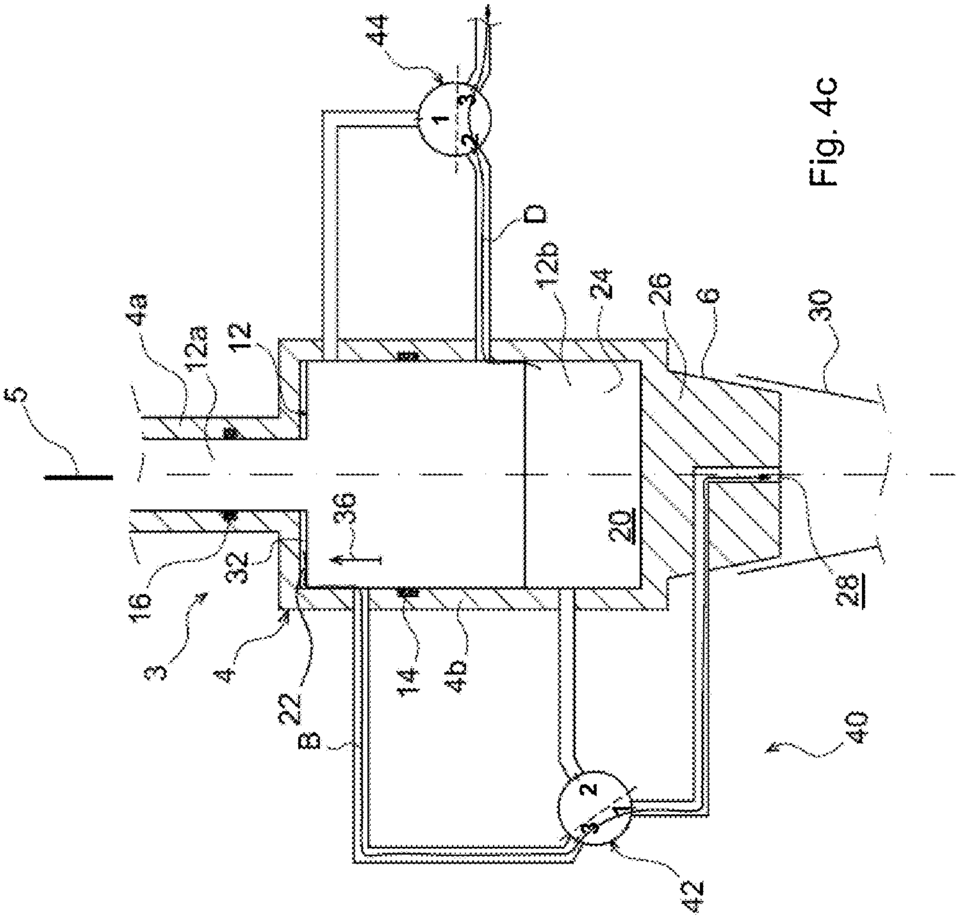
Figure 4D:
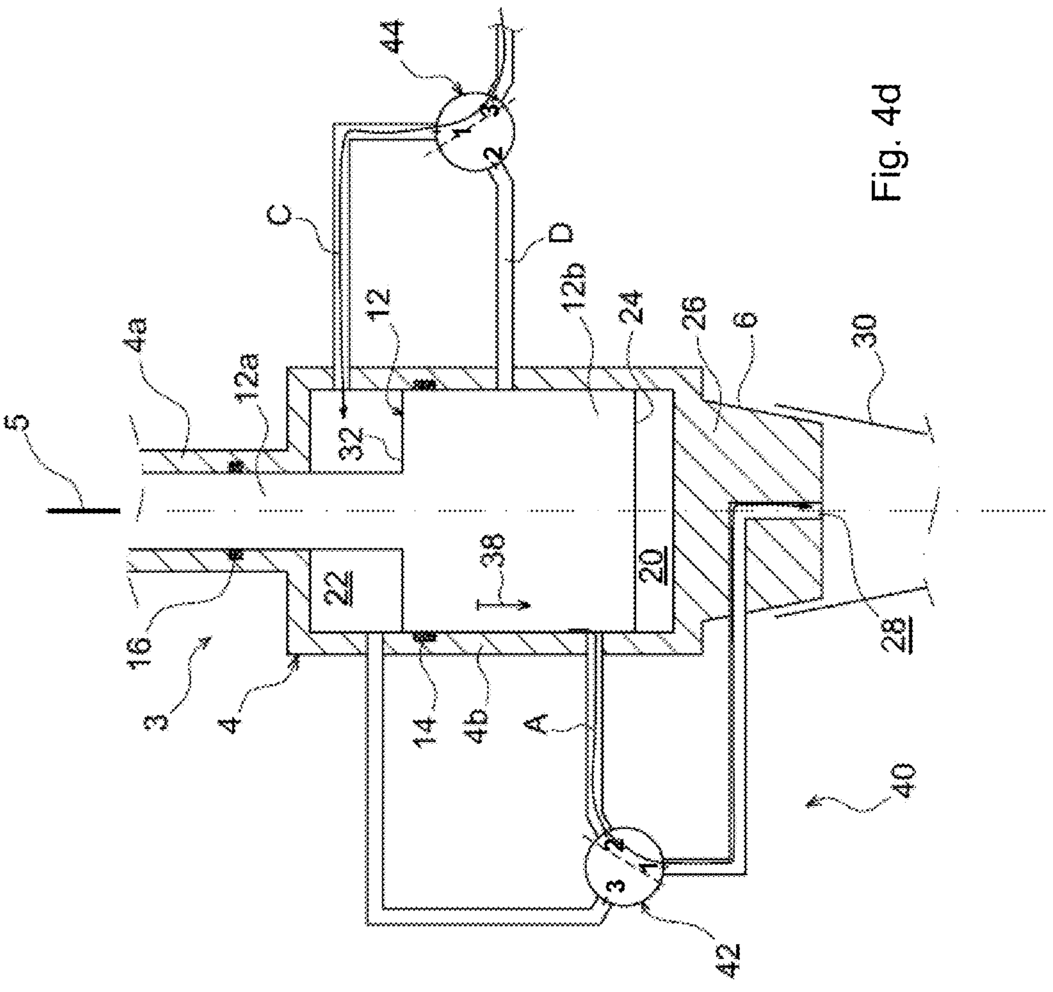

At the end of the first upward stroke of the piston shown in FIG. 4*a*, the quantity of liquid drawn into the tip is therefore 100 μl. Control application 208 delivers instructions to solenoid valves 42, 44 so that they simultaneously switch over to a configuration setting up communications B and D. Control application 208 delivers instructions to motor 210 to place the piston in movement in the downward direction 38. During this movement shown in FIG. 4*b*, the volume of chamber 22 increases, which sets up aspiration in communication B in the direction leading from the channel 28 towards the chamber 22, since communication D isolates this chamber from the exterior air. This aspiration translates as a new rise of liquid in the tip 30 whose distal end is still immersed in this same liquid. At the same time, communication D allows air to escape from the lower chamber 20 whose volume decreases, the air escaping to exterior the pipette which prevents the onset of over pressure in chamber 20. Therefore, the upward and downward strokes of the piston 12 follow each other alternately as many times as is necessary i.e. four times in this case to reach the desired volume of 400 μl. Control application 208 may provide an indication in display 118 of the number of strokes already conducted and/or remaining to be conducted.

When the second and last back-and-forth movement of the piston is completed, the desired volume of 400 μl contained in the sampling tip 30 can be dispensed/transferred to another receptacle in a similar manner. Here again, the display 118 may automatically display the number of strokes to be performed to ensure full dispensing of the desired volume, and can display the number of strokes already performed and/or remaining to be performed for this dispensing operation.

Once the tip 30 is inserted in the receptacle intended to collect the previously aspirated liquid, the user can provide the instruction for example by pressing a button of the plurality of user controls 120 provided for this purpose, to initiate dispensing of the liquid. At the time dispensing is initiated, the piston 12 lies in bottom position with solenoid valves 42, 44 setting up communications B and D. Control application 208 delivers an instruction to place the piston 12 in movement in the upward direction 36. During this movement illustrated in FIG. 4*c*, the volume of the upper chamber 22 is decreases, which sets up a pressure in communication B leading from chamber 22 towards channel 28, since communication D isolates this chamber 22 from exterior air. This pressure translates as ejection of the liquid through the distal end of the tip 30 into the appropriate receptacle. At the same time, communication D allows exterior air to enter into the lower chamber 20 whose volume is increased, thereby preventing the onset of negative pressure in chamber 20.

At the end of the first upward stroke of the piston, the quantity of liquid extracted from the tip is therefore 100 μl. Control application 208 delivers instructions to the solenoid valves 42, 44 so that they switch over to a configuration setting up communications A and C. Control application 208 delivers instructions to motor 210 to place the piston 12 in movement in the downward direction 38. During this movement illustrate in FIG. 4*d*, the volume of the lower chamber 20 is seen to decrease which sets up pressure inside communication A in the direction leading from chamber 20 towards nozzle channel 28, since communication C isolates chamber 20 from the exterior air. This pressure translates as a new ejection of liquid through the distal end of the tip 30 into the appropriate receptacle. At the same time, communication C allows exterior air to enter the upper chamber 22 whose volume is increased, thereby preventing the onset of a negative pressure in chamber 22. Therefore, the upward and downward strokes of the piston 12 follow after each other alternately as many times as is necessary i.e. four times in this case to transfer the desired volume of 400 μl.

Figure 5:
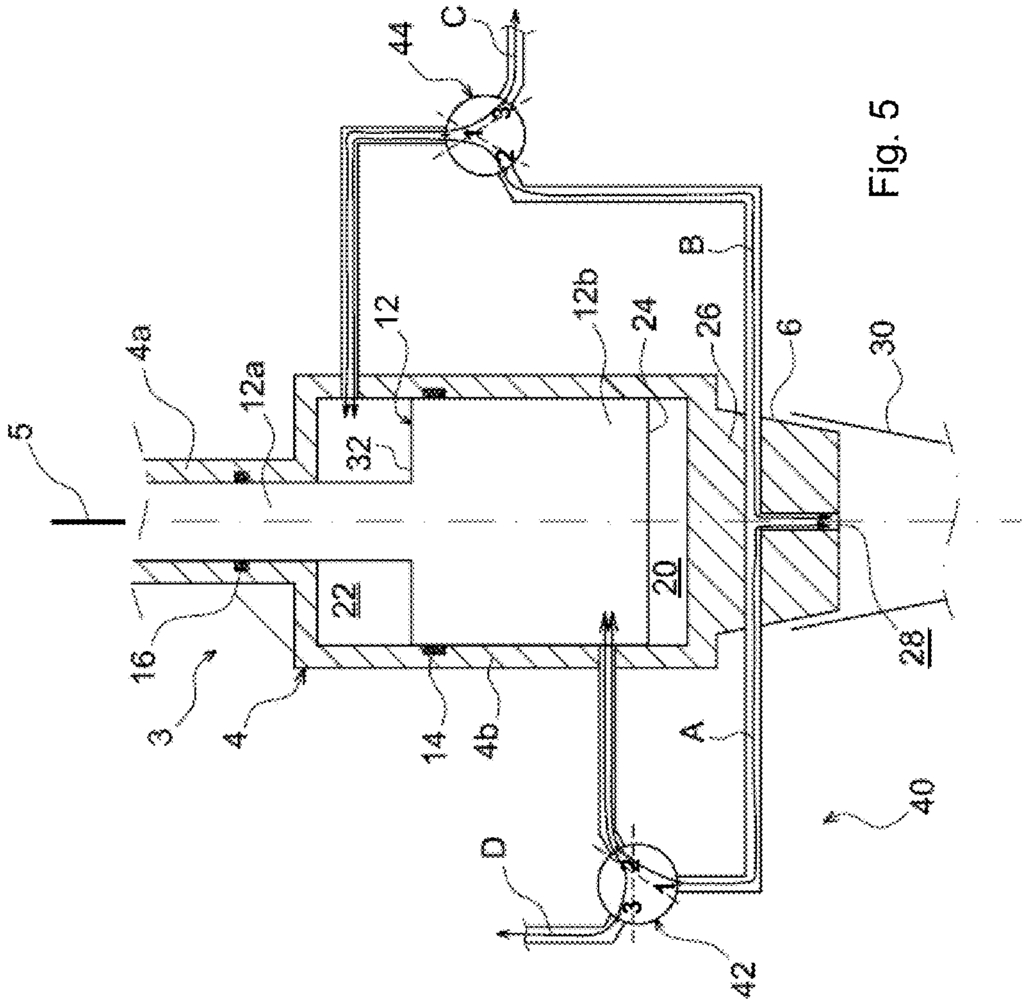
FIG. 5 depicts a partial, cross-sectional, side view of a sampling pipette in accordance with a second example embodiment.

With reference to FIG. 5, a portion of sampling pipette 100 is shown in accordance with a second example embodiment. Only the connections of the first and second solenoid valves 42, 44 have been modified with respect to those previously described. The first solenoid valve 42 has three inlets 1, 2, 3 of which inlet 1 communicates with the nozzle channel 28, at its upper end opening radially/laterally into the body 4, inlet 2 communicates with the lower chamber 20 via section 4*b*, and inlet 3 communicates with the exterior of the pipette. The communications may be permanently established for example using simple connecting conduits. The inlets only communicate with each other when the solenoid valve 42 is controlled for this purpose. In the example embodiment, only communications between inlets 1 and 2 and between inlets 1 and 3 may be alternately provided by the sliding valve piston. Communication between inlets 2 and 3 may not implemented and may be made impossible by the design of the solenoid valve.

The second solenoid valve 44 has three inlets 1, 2 3, of which inlet 2 communicates with the nozzle channel 28 at another upper end opening radially/laterally into the body 4, inlet 1 communicates with chamber 22 via section 4*b* and inlet 3 communicates with the exterior of the pipette. The communications may be permanently established for example using simple connecting conduits. The inlets only communicate with each other when the second solenoid valve 44 is controlled for this purpose. In the example embodiment, only communications between inlets 1 and 2 and between inlets 1 and 3 may be alternately provided by the sliding valve piston. Communication between inlets 2 and 3 may not implemented and may be made impossible by the design of the solenoid valve.

With reference to FIG. 5, the first solenoid valve 42, when inlets 1 and 2 are in communication, ensures the first fluid communication A which provides free circulation of air between the lower chamber 20 and the nozzle channel 28 leading into the tip 30, while preventing communication of this chamber 20 with the exterior. When inlets 2 and 3 are in communication, the first solenoid valve 42 ensures the fourth fluid communication D allowing free circulation of air between the lower chamber 20 and the exterior of the pipette, but in this case preventing communication of channel 28 with chamber 20. Thus, second solenoid valve 42 is particularly dedicated to the management of air in the lower chamber 20 and does not communicate with the upper chamber 22.

Similarly, it can be seen with reference to FIG. 5 that the second solenoid valve 44, when inlets 1 and 2 are in communication, ensures the second fluid communication B which provides the free circulation of air between chamber 22 and the nozzle channel 28 leading into the tip 30, while preventing communication between this chamber 22 and the exterior. On the other hand, when inlets 1 and 3 are in communication, second solenoid valve 44 ensures the third fluid communication C which provides the free circulation of air between the upper chamber 22 and the exterior of the pipette, but prevents communication of channel 28 with this chamber 22. Thus, the second solenoid valve 44 is particularly dedicated to the management of air in the upper chamber 22 without communicating with the lower chamber 20.

The second embodiment of FIG. 5 reduces the risk of liquid leakage to zero, even if the synchronization of the two solenoid valves is not perfect. For example, subsequent to an upward stroke of the piston 12 leading to liquid sampling through the establishment of communications A and C, switching of the first solenoid valve 42 over to configuration D carried out slightly before second solenoid valve 44 switches over to configuration B, does not involve any break in the negative pressure prevailing in channel 28 and the tip 30 filled with liquid because the volume inside these latter parts becomes sealed and therefore does not communicate with the exterior. The same applies to the reverse case when switching of second solenoid valve 44 is made slightly before the switching of first solenoid valve 42, since the volume of air in the nozzle channel 28 and tip 30 are first placed in communication with chamber 22 which has become isolated from the exterior by means of fluid communication B. Here again, the lack of any break in the negative pressure prevailing in channel 28 and the tip 30 prevents the leakage of liquid already sampled and contained in the tip 30.

This beneficial effect applies both when the stroke direction is reversed with the piston lying in a top position, and when the stroke direction is reversed with the piston lying in a bottom position. The pipette fabricated in this manner is therefore able to offer very high accuracy since, irrespective of the order of switching of the solenoid valves instructed by the processor 206 before each inversion of the piston stroke, there is no risk of any liquid leakage. Relative to the embodiment illustrated in FIG. 5, the control application 208 is programmed so that the functioning of the pipette is as described above, in particular regarding the automatic, alternate establishing of fluid communications A and C and fluid communications B and D.

Figure 6:
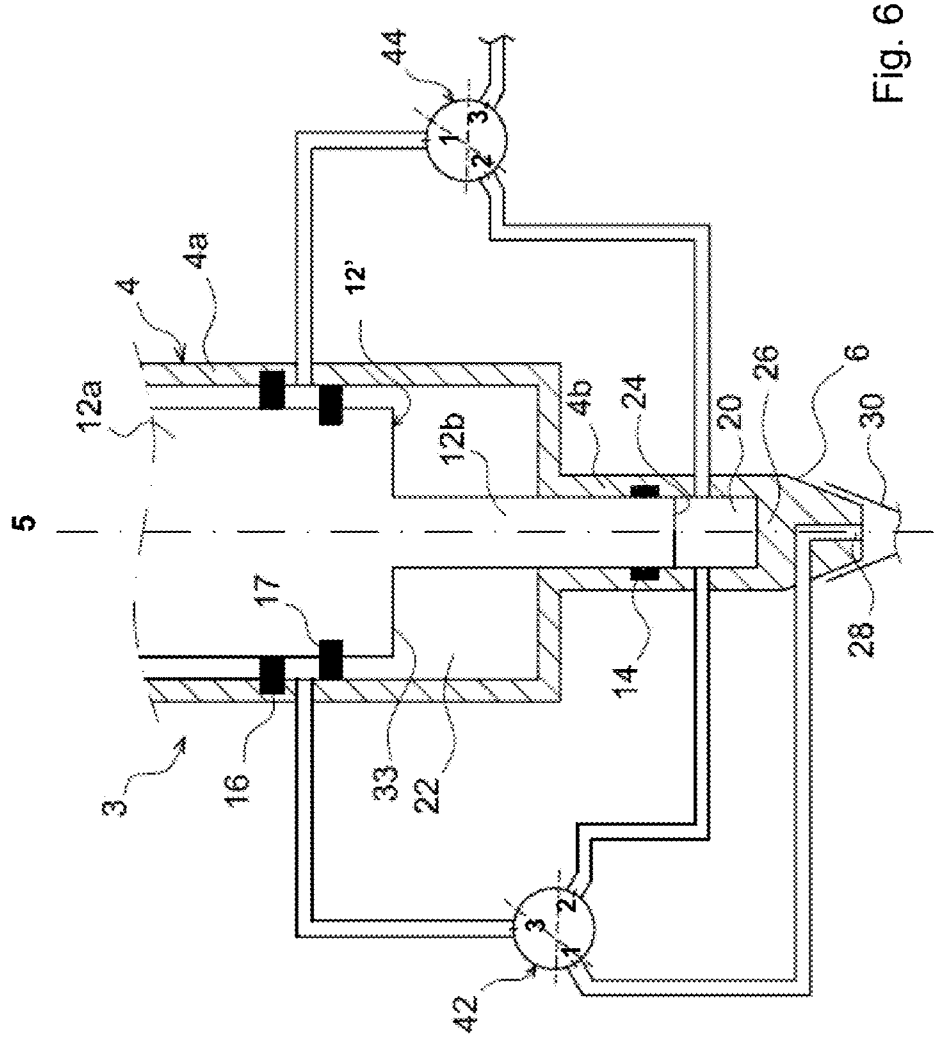
FIG. 6 depicts a partial, cross-sectional, side view of a sampling pipette in accordance with a third example embodiment.

With reference to FIG. 6, a portion of sampling pipette 100 is shown in accordance with a third example embodiment. Only the design of the piston and its associated aspiration chambers has been modified relative to the embodiment shown FIGS. 3 and 4*a* to 4*d*. Therefore, the control of solenoid valves 42 and 44 is the same as discussed above with reference to FIGS. 4*a*-4*d*.

As illustrated in FIG. 6, the lower pipette body 4 is still hollow so that it can house a double-section sliding piston 12' in an appropriate cavity. The piston 12' has an upper cylindrical portion 12*a* which is continued by a lower cylindrical portion 12*b* of smaller diameter. Portion 12*b* is guided by a section of the lower body 4*b* of complementary shape, while portion 12*a* is housed in concentric fashion and at a distance in a section of the upper body 4*a* of larger diameter. In addition, each of these two hollow sections 4*a*, 4*b* respectively has a fixed seal following the contour of the piston 12' which slides relative thereto. The piston 12' has a seal 17 which is fixed outwardly on its portion 12*a* and which follows the contour of the inner wall of the large section 4*a*, while remaining housed under the upper seal 16 during the back-and-forth movement of the piston 12'. Thus, seal 17 moves with piston 12'.

With this configuration, the lower aspiration chamber 20 is delimited by the lower seal 14, the lower end of piston 24, the inner wall of section 4*b* and the wall 26 made in the pipette body 4. In addition, the upper aspiration chamber 22 is delimited by the upper seal 16, the inner wall of section 4*a*, the piston portion 12*a*, and the seal 17. A variable volume space located between the seals 17 and 14 is not directly used for liquid sampling and dispensing, which means that it is not considered as an aspiration chamber unlike chambers 20 and 22.

With this arrangement, chamber 20 has a constant cross section relative to axis 5, in the shape of a disc of same axis and identical diameter as the inner wall of the small section 4*b*. Also, chamber 22 is of constant cross section relative to axis 5, in the shape of an annular ring of same axis having an outer diameter that is identical to that of the inner wall of the large section 4*a* and having an inner diameter identical to the outer diameter of section 12*a*.

With this arrangement, by adequately determining the diameters of the two piston portions 12*a*, 12*b* and the inner diameter of section 4*a* of the lower pipette body, a cross section of the same value can be obtained for the two chambers 20 and 22. Therefore, for a given displacement of the piston, an identical absolute value is obtained between the variation in volume in the lower chamber 20 and the variation in volume in the upper chamber 22.

Figure 7:
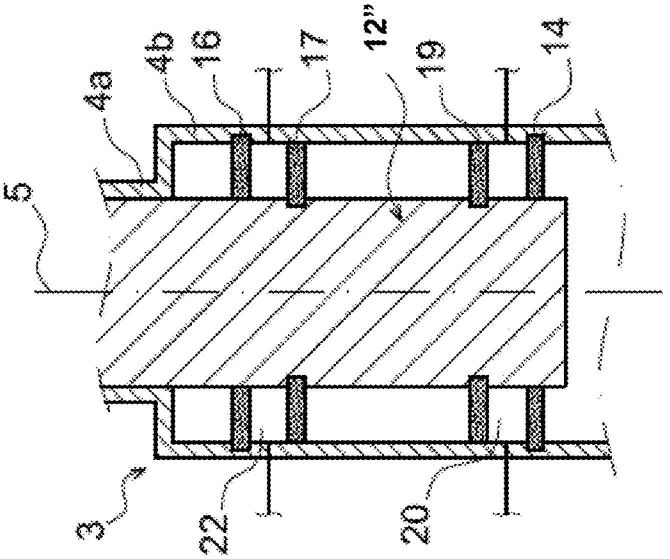
FIG. 7 depicts a partial, cross-sectional, side view of a sampling pipette in accordance with a fourth example embodiment.

With reference to FIG. 7, a portion of sampling pipette 100 is shown in accordance with a fourth example embodiment. Only the design of the piston and its associated aspiration chambers has been modified with respect to the preceding embodiments shown in FIGS. 3, 4*a* to 4*d*, and 6. Therefore, the control of the solenoid valves 42, 44 is identical or similar to one of those previously described. As can be seen in FIG. 7, the lower pipette body 4 is still hollow so that it can house the single section sliding piston 12" in an appropriate cavity. Piston 12", housed in said cavity, has an upper cylindrical portion guided by an upper body section 4*a* of complementary shape, the piston being continued by a lower cylindrical portion of same diameter housed concentrically and at a distance in a lower body section 4*b* of larger diameter. Also, the lower hollow section 4*b* fixedly houses the upper seal 16 and the lower seal 14, which both follow the contour of the piston 12 which slides with respect thereto and is located at a distance radially inwardly with respect to the large section 4*b*. Also, same piston 12" has a seal 17 outwardly fixed to it which follows the contour of the inner wall of the large section 4*b*, while remaining housed underneath the upper seal 16 during the back-and-forth movement of the piston. Similarly, it has a seal 19 fixed outwardly to it, which also follows the contour of the inner wall of the large section 4*b* while remaining housed underneath seal 17 and above the lower seal 14 during the back-and-forth movement of the piston. Thus, seals 17 and 19 move with piston 12" while seals 14 and 16 are fixed to section 4*b*.

With the configuration of FIG. 7, the lower aspiration chamber 20 is delimited by the seal 19, the inner wall of section 4*b*, the piston 12", and the fixed seal 14. Similarly the upper aspiration chamber 22 is delimited by the seal 17, the inner wall of section 4*b*, the piston 12", and the fixed seal 16. Chambers 20 and 22 have the same constant cross section relative to axis 5, in the shape of an annular ring of same axis having an outer diameter identical to that of the inner wall of the large section 4*b*, and an inner diameter identical to the diameter of the piston. Therefore, in this embodiment, for a given displacement of the piston 12", an identical absolute value is also obtained between the variation in volume in the lower chamber 20 and the variation in volume in the upper chamber 22. Additionally, the piston 12" advantageously has a simple shape which facilitates its fabrication.

Ideally, the distance between seals 16 and 17 at the end of the upward stroke of the piston is equal to the distance between seals 14 and 19 at the end of the downward piston stroke, to obtain equal dead volumes in chambers 20 and 22, and thereby, improve the symmetry of pipetting during movement of the piston in each of the two directions because the pipetted volume depends not only on the volume displaced by the piston but also on the dead volume.

With reference to FIGS. 8*a*-9*b*, a portion of sampling pipette 100 is shown in accordance with a fifth example embodiment. The design of the piston and its associated aspiration chambers is identical or similar to the embodiment shown in FIG. 6 though it could be identical or similar to that of any of the other embodiments presented above without departing from the scope of the invention.

Figure 8A:
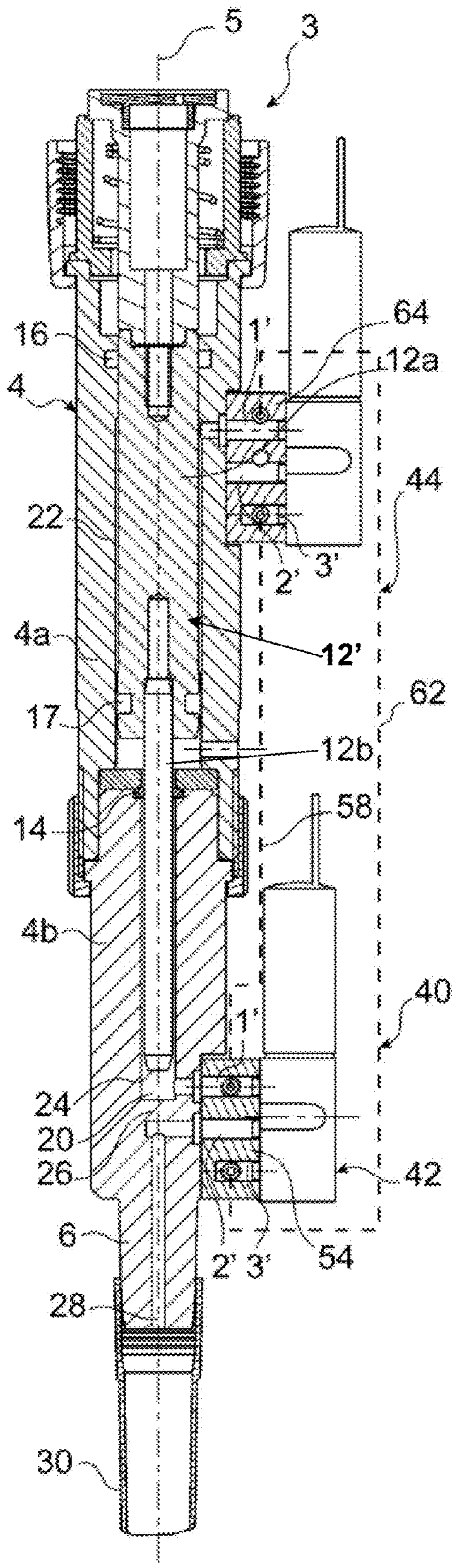
FIGS. 8*a* and 8*b* depict partial, cross-sectional, side views of a sampling pipette in accordance with a fifth example embodiment.
Figure 8B:
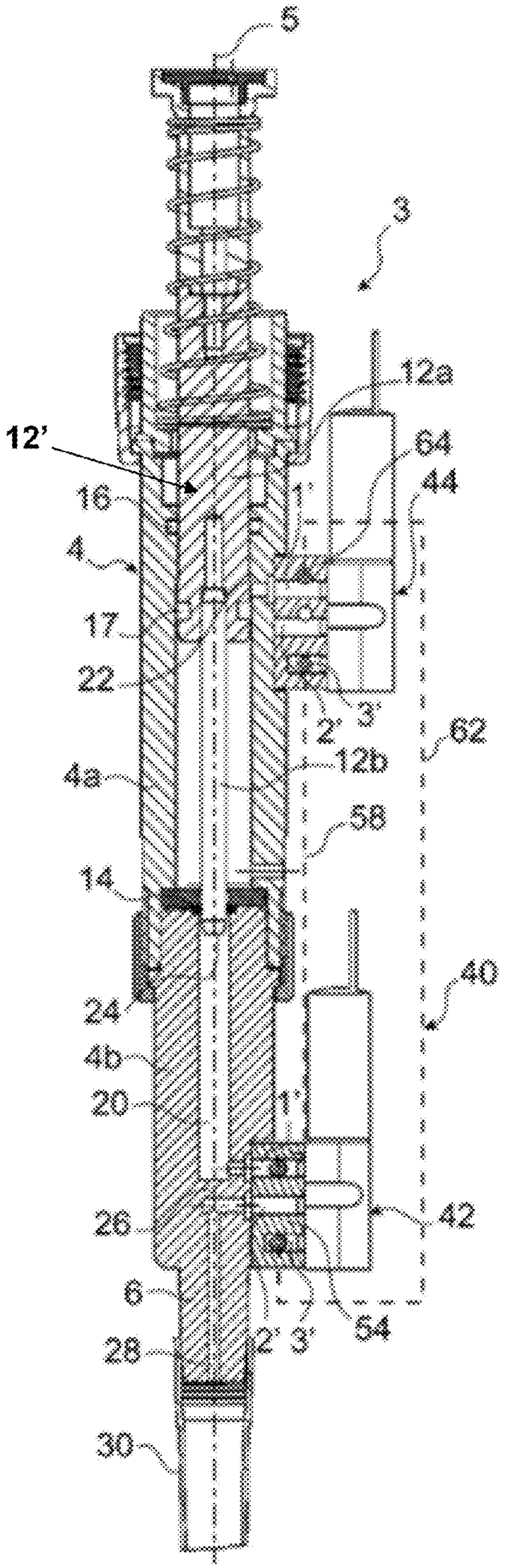

FIG. 8*a* shows the pipette 100 with its piston 12' in a bottom position, whereas FIG. 8*b* shows the pipette 100 with its piston 12' in a top position. Two three-way solenoid valves 42, 44 are provided of the type incorporating a linear piston 52 and having three inlets 1, 2, 3. By means of the movement of the linear piston 52 having a communicating groove, each solenoid valve is able alternately to set up fluid communication between inlets 1 and 2 and between inlets 2 and 3, communication between inlets 1 and 3 being made impossible by construction. As mentioned above, these solenoid valves 42, 44 may be of the type marketed by LEE COMPANY under reference LHDA 053 1115H.

The first solenoid valve 42 is fixed to section 4*a* of the lower pipette body via a mounting plate 54 having three orifices 1', 2', 3' respectively in permanent communication with the three inlets 1, 2, 3 of the solenoid valve secured to this mounting plate. Orifice 1' communicates with the lower chamber 20 and with a connector 56 carrying a conduit 58. Orifice 2' communicates with the nozzle channel while orifice 3' communicates only with a connector 60 carrying a conduit 62. By way of indication, conduits 58, 62 may be replaced by channels made directly in the pipette body.

Similarly, second solenoid valve 44 is fixed to section 4*b* of the lower pipette body via a mounting plate 64 having three orifices 1', 2', 3' respectively in permanent communication with the three inlets 1, 2, 3 of second solenoid valve 44 secured to this mounting plate. Orifice 1' communicates with the upper chamber 22 and with a connector 66 connected to the other end of conduit 62. Orifice 2' communicates only with the exterior of the pipette, while orifice 3' communicates solely with a connector 68 connected to the other end of conduit 58.

Figure 9A:
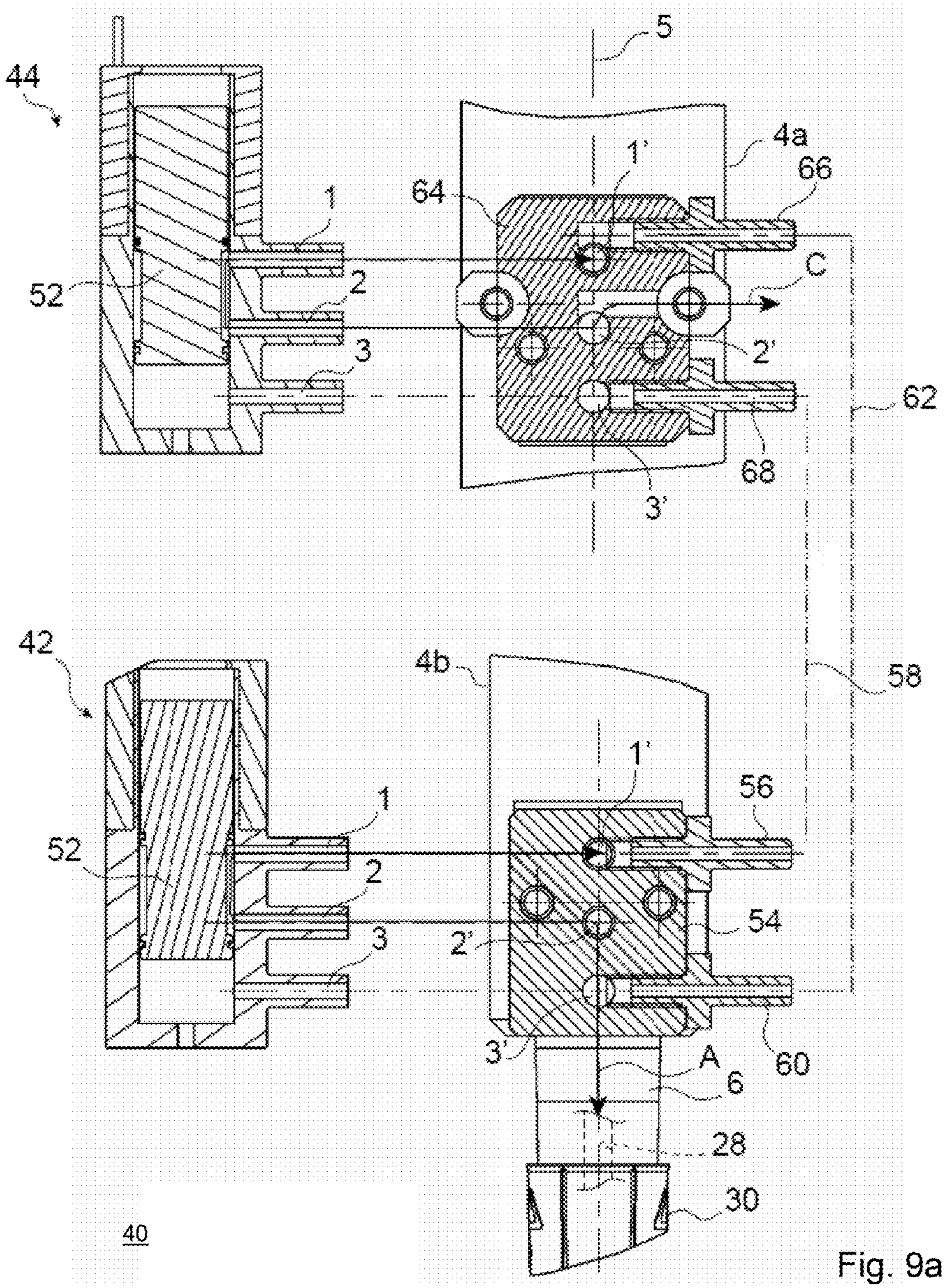
FIGS. 9*a* and 9*b* depict partially exploded cross-sectional, side views of the sampling pipette of FIGS. 8*a* and 8*b*, respectively.

As shown with reference to FIG. 9*a*, first solenoid valve 42, when inlets 1 and 2 are in communication, ensures the first fluid communication A which provides free circulation of air between the lower chamber 20 and the nozzle channel 28 leading into the tip 30. The air leaving chamber 20 circulates successively in orifice 1', inlet 1 of first solenoid valve 42, the piston groove, inlet 2 of first solenoid valve 42, orifice 2' of mounting plate 54, and the nozzle channel 28. When inlets 1 and 2 of the second solenoid valve 44 are in communication, the second solenoid valve 44 ensures the third fluid communication C allowing free circulation of air between the upper chamber 22 and the exterior of the pipette. The air leaving chamber 22 effectively circulates successively in orifice 1' of the mounting plate 64, inlet 1 of second solenoid valve 44, the piston groove, inlet 2 of second solenoid valve 44, orifice 2' of the mounting plate 64, and the exterior of the pipette.

Figure 9B:
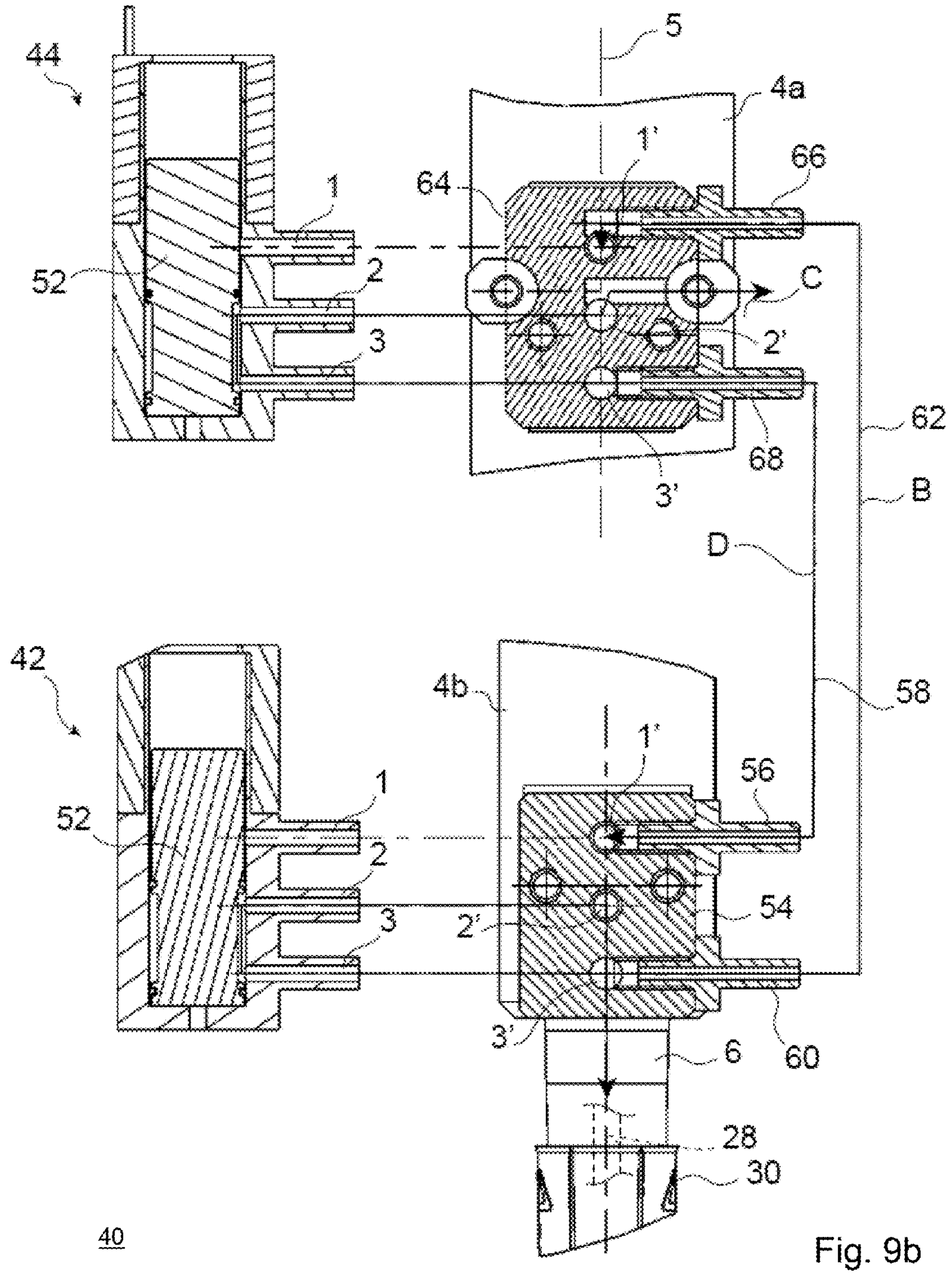

As shown with reference to FIG. 9*b*, when inlets 2 and 3 of each of the solenoid valves 42, 44 are in communication, they jointly ensure both the second fluid communication B allowing free circulation of air between the upper chamber 22 and the nozzle channel 28 leading into the tip 30, and the fourth fluid communication D allowing free circulation of air between the lower chamber 20 and the exterior of the pipette.

The air leaving chamber 22 circulates successively in orifice 1' of mounting plate 64, connector 66, conduit 62, connector 60, orifice 3' of mounting plate 54, inlet 3 of first solenoid valve 42, the piston groove, inlet 2 of first solenoid valve 42, orifice 2' of mounting plate 54, and nozzle channel 28. In addition, the air leaving chamber 20 successively circulates in orifice 1' of mounting plate 54, connector 56, conduit 58, connector 68, orifice 3' of mounting plate 64, inlet 3 of second solenoid valve 44, the piston groove, inlet 2 of second solenoid valve 44, orifice 2' of mounting plate 64, and the exterior of the pipette. In fifth embodiment shown with reference to FIGS. 8*a* to 9*b*, control application 208 is programmed so that the functioning of the pipette is as described above, in particular regarding the automatic alternate establishing of fluid communications A and C and of fluid communications B and D.

As stated previously, the number of back-and-forth (up and down) movements of the piston depends on the quantity of liquid to be transferred. However, the pipette may be controlled conventionally for example using a single piston stroke to sample liquid and a single return piston stroke to dispense the liquid, even if this conventional operating mode is solely reserved for operations concerning small volumes of liquid. The described embodiments also support the sampling of greater volumes because the capacity of the pipette is no longer limited by the maximum stroke of the piston, nor by its diameter, nor by any other element of the pipette, since the number of back-and-forth operations of the piston dedicated to one same liquid sampling operation is in theory unlimited. Additionally, the large capacity associated with the pipette, which includes two chambers partly delimited by the piston, is in no way detrimental to the global ergonomics of the pipette, since the maximum stroke of the piston, irrespective of the maximum sampling capacity of the pipette, can be freely set at a reasonable value.

By way of example, if a maximum stroke in a given direction of the piston can sample 100 μl to an accuracy of 0.1 μl, the sampling of a liquid volume of 863.2 μl will be achieved with four back-and-forth movements of the piston, followed by a last partial stroke corresponding to 63.2 μl. One of the advantages, of course, lies in the fact that the sampling of 863.2 μl is obtained with an accuracy similar to the accuracy of a conventional pipette since it has a maximum piston stroke drawing a sample of 100 μl, which is greater than the accuracy of a conventional pipette for which the total volume of 863.2 μl has to be sampled during a single piston stroke.

Control application 208 determines the number of strokes and their length in relation to the volume to be sampled after entry by the user. The calculated data may optionally be displayed. Control application 208 may choose the maximum stroke offered by the pipette's design, with the exception of the last stroke which may correspond to only a fraction of the maximum possible stroke, so that the exact desired volume can be obtained. In an alternative embodiment, control application 208 may determine that a full stroke of the piston is made over a shorter length than the designed maximum length. In an example embodiment, the full stroke of the piston in each of the two sliding directions may result in the same quantity of liquid, though this is not necessary.

In alternative embodiments, instead of three-way solenoid valves other alternative solutions can be provided. For example, the opening/closing of each chamber with respect to the exterior may be provided by two "on/off" solenoid valves to ensure the alternate first and second fluid communications, while being synchronized with these latter means. More generally, each three-way solenoid valve may be replaced by two "on/off" solenoid valves also called two-way valves.

The word "example" is used herein to mean serving as an example, instance, or illustration. Any aspect or design described herein as "example" is not necessarily to be construed as preferred or advantageous over other aspects or designs. Further, for the purposes of this disclosure and unless otherwise specified, "a" or "an" means "one or more".

The foregoing description of example embodiments of the invention have been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A device comprising:

a body comprising a nozzle, a first chamber, a second chamber, and a channel formed in the nozzle, wherein the first chamber is isolated from the second chamber, and the channel is isolated from the first chamber and the second chamber;

a piston mounted to slide within the first chamber and the second chamber so that movement of the piston simultaneously increases a first volume of the first chamber and decreases a second volume of the second chamber; and a valve in communication with the first chamber, the second chamber, the channel, and an exterior of the body to selectively provide a communication between the first chamber and the channel, between the second chamber and the channel, between the first chamber and the exterior of the body, and between the second chamber and the exterior of the body.

2. The device of claim 1, wherein the valve comprises a plurality of valves.

3. The device of claim 1, wherein the valve comprises a plurality of three-way valves.

4. The device of claim 1, wherein the valve comprises a plurality of two-way valves.

5. The device of claim 1, further comprising:

a processor operably coupled to the valve; and a computer-readable medium operably coupled to the processor, the computer-readable medium having instructions stored thereon that, when executed by the processor, control switching of the valve to provide the selective communication.

6. The device of claim 5, further comprising:

a motor operably coupled to move the piston, wherein the processor is operably coupled to the motor and the computer-readable medium further has instructions stored thereon that, when executed by the processor, control movement of the motor to thereby control the sliding movement of the piston.

7. The device of claim 6, further comprising an input interface configured to receive a volume of liquid to aspirate.

8. The device of claim 7, wherein the computer-readable medium further has instructions stored thereon that, when executed by the processor, determine a first number of upward movements of the piston and a second number of downward movements of the piston based on the received volume of liquid to aspirate.

9. The device of claim 1, wherein the valve is configured for manual operation by a user.

10. The device of claim 1, wherein the device is a multichannel pipette.

11. The device of claim 1, wherein the first chamber is isolated from the second chamber using a seal mounted between the first chamber and the second chamber.

12. The device of claim 11, wherein the seal is mounted to the piston.

13. The device of claim 11, wherein the seal is mounted to a wall of the body.

14. The device of claim 1, wherein the channel is isolated from the first chamber using a wall mounted between the channel and the first chamber.

15. The device of claim 1, wherein the piston has a constant cross section.

16. The device of claim 15, wherein the first chamber is isolated from the second chamber using a first upper seal and a first lower seal mounted to a wall of the body and using a second upper seal and a second lower seal mounted to the piston, wherein the second upper seal and the second lower seal are between the first upper seal and the first lower seal.

17. The device of claim 1, wherein the piston is formed of a first portion and a second portion, wherein the first portion and the second portion have different constant cross sections.

18. The device of claim 1, wherein the valve comprises:

a first three-way valve comprising a first inlet in communication with the first chamber, a second inlet in communication with the second chamber, and a third inlet in communication with the channel; and a second three-way valve comprising a fourth inlet in communication with the first chamber, a fifth inlet in communication with the second chamber, and a sixth inlet in communication with the exterior of the body.

19. The device of claim 1, wherein the valve comprises:

a first three-way valve comprising a first inlet in communication with the first chamber, a second inlet in communication with the exterior of the body, and a third inlet in communication with the channel; and a second three-way valve comprising a fourth inlet in communication with the second chamber, a fifth inlet in communication with the channel, and a sixth inlet in communication with the exterior of the body.

20. A computer-readable medium having stored thereon computer-readable instructions that, when executed by a processor, cause a device to:

(a) switch a valve to provide communication between a first chamber and an exterior of a body of the device wherein the body houses a nozzle, the first chamber, a second chamber, a channel formed in the nozzle, and a piston mounted to slide within the first chamber and the second chamber;

(b) switch the valve to provide communication between the second chamber and the channel, wherein the second chamber and the channel are isolated from the first chamber;

(c) slide the piston in a first direction decreasing a first volume of the first chamber and increasing a second volume of the second chamber thereby aspirating a first volume of liquid into a tip of the device;

(d) switch the valve to provide communication between the first chamber and the channel;

(e) switch the valve to provide communication between the second chamber and the exterior of the body;

(f) slide the piston in a second direction opposite the first direction increasing the first volume of the first chamber and decreasing the second volume of the second chamber thereby aspirating a second volume of liquid into the tip of the device; and (g) repeat (a)-(f) until a selected volume is aspirated into the tip of the device.

* * * * *